United States Patent
Shin et al.

(10) Patent No.: US 9,106,303 B2
(45) Date of Patent: Aug. 11, 2015

(54) RELAY AND METHOD FOR PERFORMING NETWORK CODING

(75) Inventors: Won Jae Shin, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 13/495,448

(22) Filed: Jun. 13, 2012

(65) Prior Publication Data

US 2013/0039256 A1   Feb. 14, 2013

(30) Foreign Application Priority Data

Aug. 8, 2011   (KR) .................. 10-2011-0078622

(51) Int. Cl.
| | | |
|---|---|---|
| *H04B 7/14* | (2006.01) | |
| *H04B 7/155* | (2006.01) | |
| *H04B 7/06* | (2006.01) | |
| *H04B 7/08* | (2006.01) | |

(52) U.S. Cl.
CPC .......... *H04B 7/15521* (2013.01); *H04B 7/0617* (2013.01); *H04B 7/086* (2013.01)

(58) Field of Classification Search
None
See application file for complete search history.

(56) References Cited

U.S. PATENT DOCUMENTS

| | | | |
|---|---|---|---|
| 7,110,715 B2 | 9/2006 | Gupta | |
| 2009/0017753 A1* | 1/2009 | Kim et al. | 455/10 |
| 2010/0142447 A1* | 6/2010 | Schlicht et al. | 370/328 |
| 2010/0232345 A1* | 9/2010 | Tsai et al. | 370/315 |
| 2010/0261480 A1* | 10/2010 | Cho et al. | 455/445 |
| 2011/0069633 A1* | 3/2011 | Schmidt et al. | 370/254 |
| 2011/0235750 A1* | 9/2011 | Shin et al. | 375/296 |
| 2013/0039265 A1* | 2/2013 | Shin et al. | 370/326 |
| 2013/0044683 A1* | 2/2013 | Maltsev et al. | 370/328 |
| 2014/0254469 A1* | 9/2014 | Stephens et al. | 370/315 |

FOREIGN PATENT DOCUMENTS

| | | |
|---|---|---|
| JP | 2011-055374 A | 3/2011 |
| KR | 10-2007-0045441 A | 5/2007 |
| KR | 10-2007-0106899 A | 11/2007 |
| KR | 10-2009-0118815 A | 11/2009 |
| KR | 10-2010-0007691 A | 1/2010 |
| KR | 10-2011-0008583 A | 1/2011 |
| KR | 10-2011-0015207 A | 2/2011 |
| KR | 10-2011-0053175 A | 5/2011 |

OTHER PUBLICATIONS

Yilmaz et al., "Multi-Pair Two-Way Relay Channel with Multiple Antenna Relay Station", May 2010, IEEE, All Pages.*

\* cited by examiner

*Primary Examiner* — Otis L Thompson, Jr.
(74) *Attorney, Agent, or Firm* — NSIP Law

(57) ABSTRACT

Provided is a method and relay that performs network coding. The relay may determine transmission and/or receiving beamforming vectors for terminals so as to align effective channels of a plurality of transmit-and-receive pairs into different dimensions.

15 Claims, 6 Drawing Sheets

FIG. 5
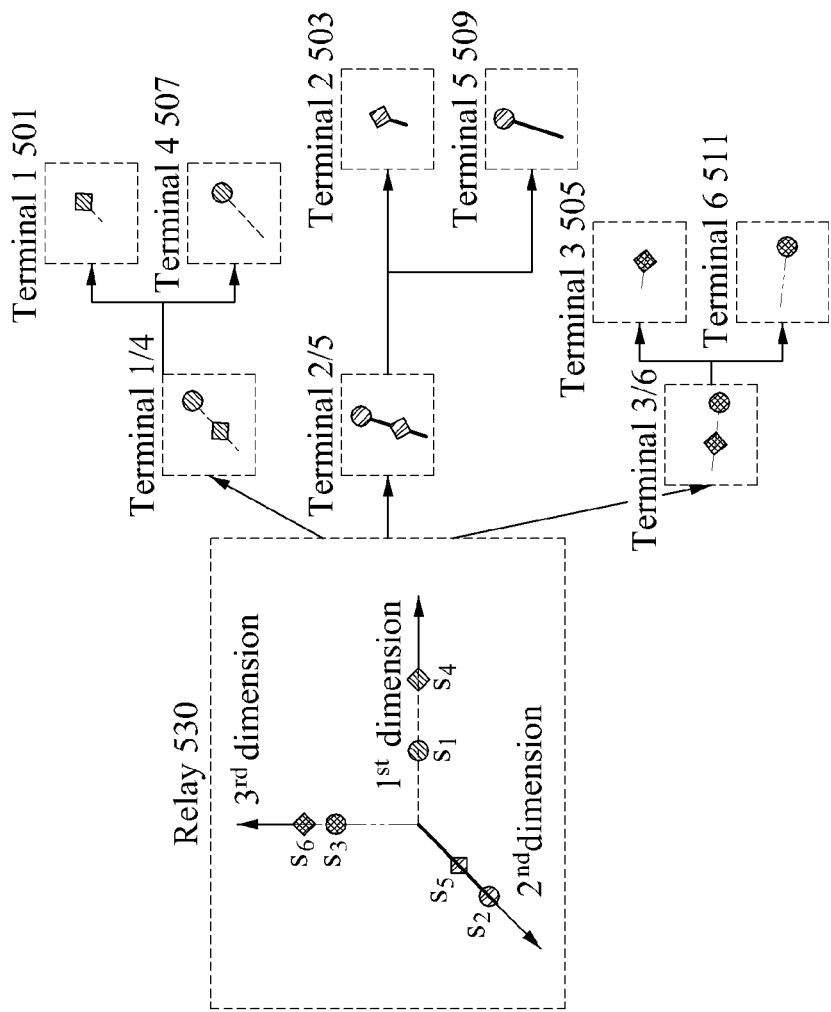
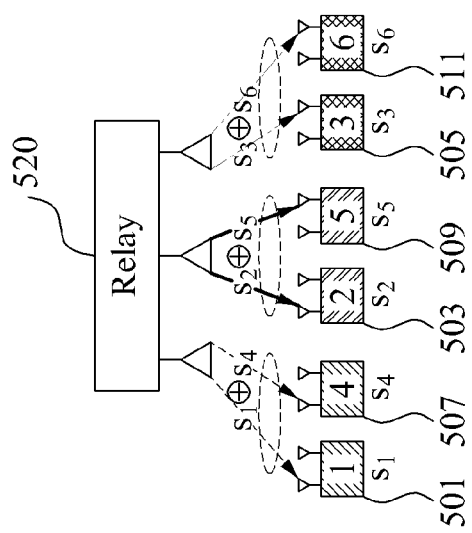

RELAY AND METHOD FOR PERFORMING NETWORK CODING

CROSS-REFERENCE TO RELATED APPLICATION(S)

This application claims the benefit under 35 U.S.C. §119(a) of Korean Patent Application No. 10-2011-0078622, filed on Aug. 8, 2011, in the Korean Intellectual Property Office, the entire disclosure of which is incorporated herein by reference for all purposes.

BACKGROUND

1. Field

The following description relates to a relay and method that performs network coding.

2. Description of Related Art

Communication systems are used to connect a user to another user to perform voice, video, and text communication. It is estimated that at least one percent of all devices around the world may be connected to each other over a network. As communication technologies continue to increase, a larger network is expected to be established. These communication technologies include smart phones, sensor devices, and other varied devices having different functions.

Through these communication devices users may readily share contents, may perform synchronization and output, and may utilize various applications, for example, a game, through direct contact among the communication devices.

To adapt to changes in the market, there is a need for a wireless access technology that supports a direct communication among devices such as a device-to-device (D2D) communication, in addition to a cellular communication based on a conventional infrastructure.

SUMMARY

In one general aspect, there is provided a method of performing network coding in a network including K transmit-and-receive pairs and a relay including M antennas, each terminal included in the K transmit-and-receive pairs including N antennas, the method including determining transmission beamforming vectors for the terminals included in the K transmit-and-receive pairs so that effective channels from the K transmit-and-receive pairs to the relay are aligned in independent dimensions, in response to the K transmit-and-receive pairs simultaneously transmitting signals, detecting the signals transmitted from the K transmit-and-receive pairs using the effective channels aligned in the independent dimensions, determining reception beamforming vectors for the terminals included in the K transmit-and-receive pairs so that the effective channels of the terminals included in the K transmit-and-receive pairs are aligned in the same dimension, and simultaneously transmitting network-coded signals for the K transmit-and-receive pairs, the network-coded signals being generated based on the detected signals.

M corresponding to a number of the antennas included in the relay may be greater than or equal to K corresponding to a number of the transmit-and-receive pairs, and M may be less than 2N corresponding to twice the number of antennas of each terminal included in the K transmit-and-receive pairs.

The relay may determine the transmission beamforming vectors in a first time slot, and perform network coding that determines the reception beamforming vectors in a second time slot.

Signals among terminals included in one of the K transmit-and-receive pairs may be aligned in the same dimension.

The method may further comprise separating remaining transmit-and-receive pairs from one of the K transmit-and-receive pairs such that the remaining transmit-and-receive pairs are in different dimensions from the one transmit-and-receive pair.

The determining of the reception beamforming vectors of the terminals included in the K transmit-and-receive pairs may be based on an assumption that the effective channels obtained by applying the reception beamforming vectors to the terminals included in the K transmit-and-receive pairs are the same.

The terminals included in one of the K transmit-and-receive pairs may receive signals that are equivalently network-coded.

In another aspect, there is provided a computer-readable storage medium having stored therein program instructions to cause a processor to execute method of performing network coding in a network including K transmit-and-receive pairs and a relay including M antennas, each terminal included in the K transmit-and-receive pairs including N antennas, the method including determining transmission beamforming vectors for the terminals included in the K transmit-and-receive pairs so that effective channels from the K transmit-and-receive pairs to the relay are aligned in independent dimensions, in response to the K transmit-and-receive pairs simultaneously transmitting signals, detecting the signals transmitted from the K transmit-and-receive pairs using the effective channels aligned in the independent dimensions, determining reception beamforming vectors for the terminals included in the K transmit-and-receive pairs so that the effective channels of the terminals included in the K transmit-and-receive pairs are aligned in the same dimension, and simultaneously transmitting network-coded signals for the K transmit-and-receive pairs, the network-coded signals being generated based on the detected signals.

In another aspect, there is provided a relay including M antennas that performs network coding in a network including K transmit-and-receive pairs, each terminal included in the K transmit-and-receive pairs including N antennas, the relay including a transmission beamforming vector determining unit configured to determine transmission beamforming vectors for the terminals included in the K transmit-and-receive pairs so that effective channels from the K transmit-and-receive pairs to the relay are aligned in independent dimensions, in response to the K transmit-and-receive pairs simultaneously transmitting signals, a detector configured to detect the signals transmitted from the K transmit-and-receive pairs, using the effective channels aligned in the independent dimensions, a reception beamforming vector determining unit configured to determine reception beamforming vectors for the terminals included in the K transmit-and-receive pairs so that the effective channels of the terminals included in the K transmit-and-receive pairs are aligned in the same dimension, and a transmitter configured to transmit network-coded signals for the K transmit-and-receive pairs simultaneously, the network-coded signals being generated based on the detected signals.

M corresponding to a number of the antennas included in the relay may be greater than or equal to K corresponding to a number of the transmit-and-receive pairs, and M may be less than 2N corresponding to twice the number of antennas of each terminal included in the K transmit-and-receive pairs.

The relay may be configured to determine the transmission beamforming vectors in a first time slot, and perform network coding that determines the reception beamforming vectors in a second time slot.

The signals among terminals included in one of the K transmit-and-receive pairs may be aligned in the same dimension.

The relay may further comprise a separator configured to separate remaining transmit-and-receive pairs excluding one of the K transmit-and-receive pairs from the one excluded transmit-and-receive pair so as to be in different dimensions from the one excluded transmit-and-receive pair.

The reception beamforming vector determining unit may be configured to determine the reception beamforming vectors of the terminals included in the K transmit-and-receive pairs based on an assumption that the effective channels obtained by applying the reception beamforming vectors to the terminals included in the K transmit-and-receive pairs are the same.

The terminals included in one of the transmit-and-receive pairs may be configured to receive signals that are equivalently network-coded.

In another aspect, there is provided a relay in a network including a plurality of transmit-and-receive pairs, the relay including a transmission beamforming unit configured to determine transmission beamforming vectors for the plurality of transmit-and-receive pairs so that channels from each pair of the plurality of transmit-and-receive pairs to the relay are aligned in independent dimensions, and a detector configured to detect transmission signals from the plurality of transmit-and-receive pairs via the channels aligned in independent dimensions.

The detector may be configured to simultaneously detect a transmission signal and a reception signal from each transmit-and-receive pair, from among the plurality of transmit-and-receive pairs.

The transmission beamforming unit may be configured to align the transmission signal and the reception signal from each transmit-and-receive pair into a dimension that is different from the dimensions of the transmission signals and the receptions signals of the other transmit-and-receive pairs.

The relay may further comprise a reception beamforming unit configured to determine reception beamforming vectors for the plurality of transmit-and-receive pairs based on the detected signals so that channels from the relay to each of the plurality of transmit-and-receive pairs are aligned in independent dimensions.

The relay may further comprise a transmitter configured to simultaneously transmit the signals to the plurality of transmit-and-receive pairs via the channels aligned in independent dimensions.

Other features and aspects may be apparent from the following detailed description, the drawings, and the claims.

BRIEF DESCRIPTION OF THE DRAWINGS

FIG. 5 is a diagram illustrating an example of a method of determining reception beamforming vectors of terminals included in a plurality of transmit-and-receive pairs in a second phase for network coding.

Figure 1:
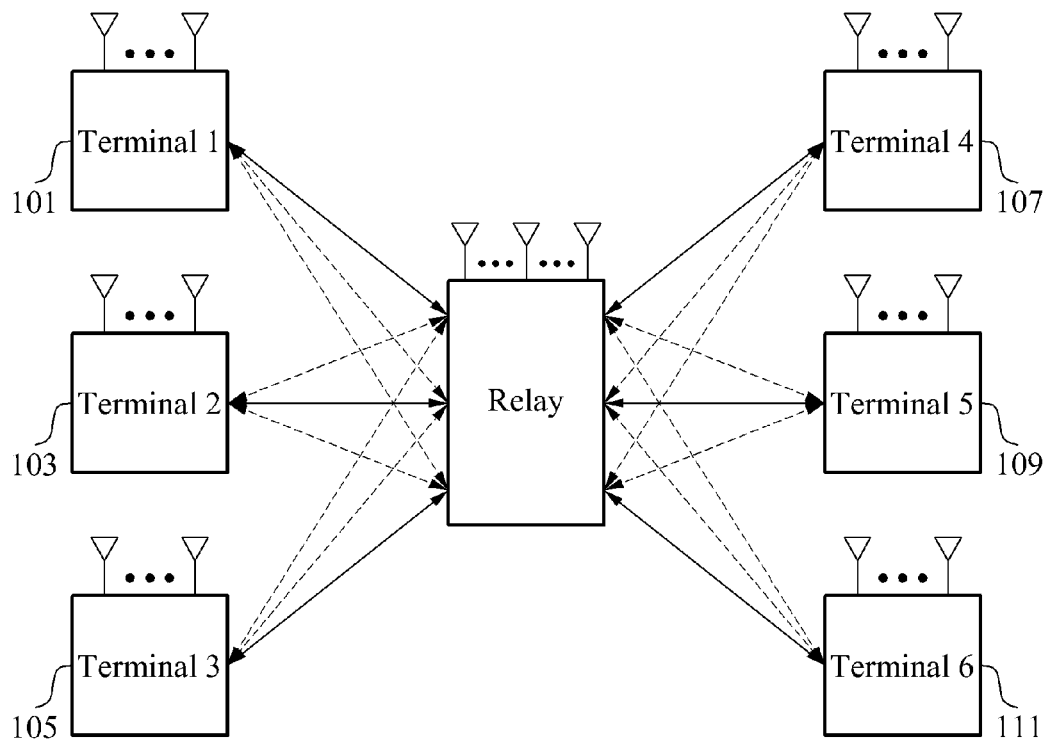
FIG. 1 is a diagram illustrating an example of a network environment including a plurality of transmit-and-receive pairs and a relay including a plurality of antennas.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

In various examples, a transmission signal refers to a signal that may be transmitted from a transmission node, and a reception signal refers to a signal that may be transmitted from a reception node. An example of a node is a terminal, such as a smart phone, a computer, a tablet, an appliance, a sensor, and the like.

FIG. 1 illustrates an example of a network environment including a plurality of transmit-and-receive pairs and a relay including a plurality of antennas. In this example, the plurality of transmit-and-receive pairs may perform network coding for a multi-pair two way relay channel.

Here, a two-way relay channel may refer to a channel through which two terminals or users exchange data using a relay. The multi-pair two-way relay channel may refer to two-way relay channels that are formed by a plurality of nodes.

An example of a relay determining transmission and reception beamforming vectors and performing network coding for effective transmission via the multi-pair two-way relay channel, is described.

Example schemes to perform data transmission via the multi-pair two-way relay channel is a decoding & forward and an amplified & forward scheme which has been used in a conventional one-way relay.

For a simple comparison, an environment in which three pairs of two-way relay channels are superposed is assumed. For a half duplex, twelve time slots may be used to exchange all data. In this example, a network capacity, that is, a transmission capacity of a network, may be inversely proportional to a number of time slots. Therefore, the transmission capacity of the network may be reduced in inverse proportion to the number of users. That is, the more users the less transmission capacity available on the network. The decrease in the transmission capacity may occur because different resources, for example, different time slots, are used for each transmission, as opposed to using an appropriate interference management scheme.

For network coding in a two-way relay of a unit-pair, a time slot may decrease to half the time slot. However, the unit-pair may divide the other resources with other pairs, and thus, six time slots may be expanded in the two-way relay of the unit-pair. The six time slots may be used because the transmission capacity of the network may decrease to be inversely proportional to the number of the terminals or users. Accordingly, if the number of terminals or users increases rapidly, a serious drawback may occur due to a decrease in the transmission efficiency in the network.

Accordingly, as described in various examples herein, a beamforming vector that enables transmission and receptions pairs to share resources in a relay having a plurality of antennas may be designed so that the transmission capacity of the network is not inversely proportional to the number of terminals.

Referring to FIG. 1, a network 100 may include six terminals, that is, a first terminal 101, a second terminal 103, a third terminal 105, a fourth terminal 107, a fifth terminal 109, and a sixth terminal 111. For example, the first terminal 101 may exchange a signal or data with the fourth terminal 107, the second terminal 103 may exchange a signal or data with the fifth terminal 109, and the third terminal 105 may exchange a signal or data with the sixth terminal 111. In this example, three transmit-and-receive pairs exist. In this example, it is assumed that a number of antennas (N) of each terminal included in the transmit-and-receive pairs is two.

The three transmit-and-receive pairs may simultaneously exchange data through a relay. In this example, a number of antennas (M) included in the relay is assumed to be three.

In FIG. 1, straight lines connected between the relay and each terminal denote signals, and dotted lines connected between the relay and each terminal denote interference. The relay may perform grouping for terminals that perform signal transmission and reception with each other, as shown in FIG. 2, so as to simultaneously exchange multiple two-way data.

Figure 2:
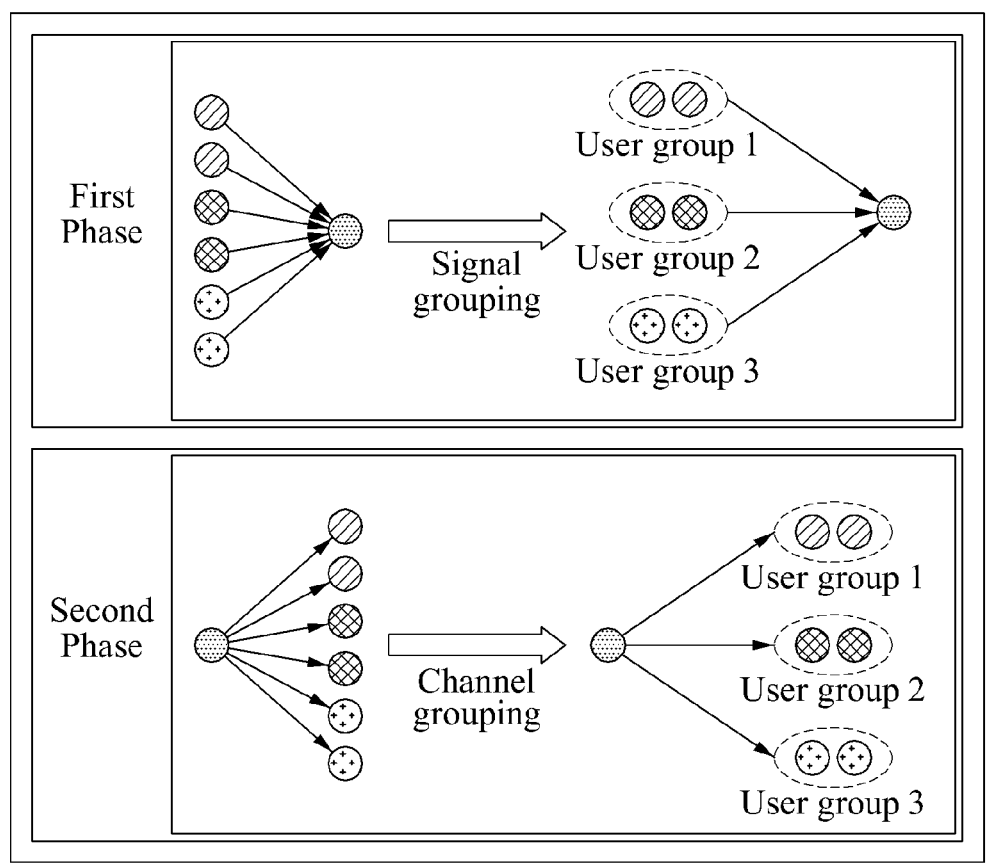
FIG. 2 is a diagram illustrating an example of a method of grouping terminals into a plurality of transmit-and-receive pairs in a network of FIG. 1.

FIG. 2 illustrates an example of a method of grouping terminals into plurality of transmit-and-receive pairs.

A plurality of transmit-and-receive pairs may simultaneously exchange signals using a single relay, as illustrated in FIG. 1. The relay may group the terminals into the plurality of transmit-and-receive pairs, and may simultaneously exchange multiple two-way data via a multi-pair two-way relay channel during two time slots.

Referring to FIG. 2, different nodes may correspond to different terminals or users, and nodes that have the same pattern may denote a transmit-and-receive pair that performs transmission and reception of data or a signal with each other.

If different nodes are to exchange signals via a two-way relay channel, the relay may simultaneously receive two signals, that is, a transmission signal and a reception signal, in a first phase. In this example, the first phase may be a medium access control (MAC) phase. The relay that simultaneously receives the two signals from different terminals may perform grouping of the signals as a transmission signal and a corresponding reception signal, to configure a transmit-and-receive pair.

A current physical-layer network coding scheme may not process three or more signals that enter simultaneously. Accordingly, three or more signals may not be entered in the same dimension in the multi-pair two-way relay.

When three pairs of two-way relay channels exist, the relay may use at least three independent dimensions. If three independent dimensions are secured, the relay may align the signals transmitted from the three transmit-and-receive pairs in the independent dimensions. The relay may determine transmission beamforming vectors so that the signals transmitted from the transmit-and-receive pairs are aligned in the independent dimensions.

For example, a scheme that aligns different signals transmitted from respective transmit-and-receive pairs in independent dimensions may be referred to as a signal alignment scheme. The relay may determine reception beamforming vectors so that effective channels of terminals included in a single transmit-and-receive pair are aligned in the same dimension in a second phase. In this example, the second phase may be a broadcasting phase.

A scheme that aligns effective channels in the same dimension may be referred to as a channel alignment scheme. The effective channels may be obtained by applying the reception beamforming vectors to two terminals included in a single transmit-and-receive pair. In this example, two signals of the two terminals that are aligned in the same dimension may be grouped as a single user group, that is, a single transmit-and-receive pair.

The described schemes may be applied to a coordinated beamforming so that a plurality of transmit-and-receive pairs may quickly exchange data using a single relay having a plurality of transmit-and-receive antennas.

A method of determining transmission beamforming vectors and reception beamforming vectors according to a network coding method may be applied to an example in which a plurality of user pairs in a cell exchange data using a base station in a cellular system and to an example in which a plurality of user pairs in an ad hoc network exchanges data using an access point (AP), a mobile relay, and the like.

Figure 3:
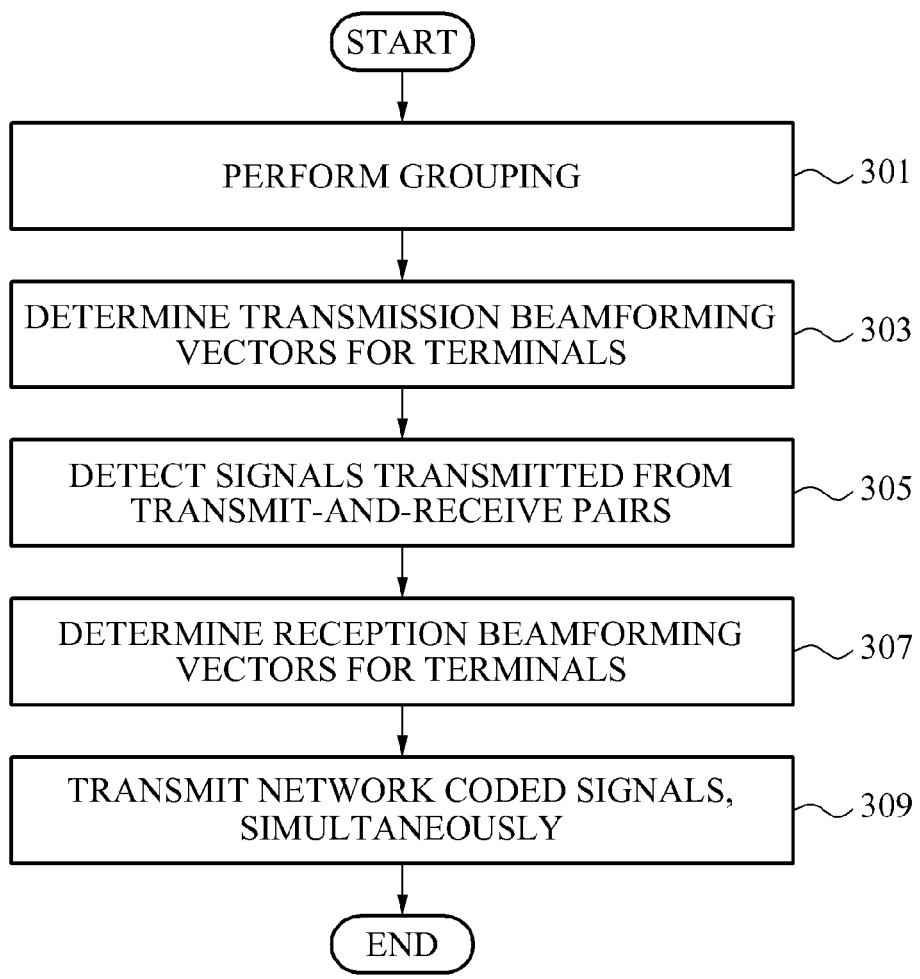
FIG. 3 is a flowchart illustrating an example of a method of performing network coding in a network including a plurality of transmit-and-receive pairs and a relay including a plurality of antennas.

FIG. 3 illustrates an example of a method of performing network coding in a network including a plurality of transmit-and-receive pairs and a relay including a plurality of antennas.

An example of a method of a relay performing network coding in a network including K transmit-and-receive pairs and a relay including M antennas, is provided. In this example, it is assumed that each terminal included in the K transmit-and-receive pairs includes N antennas.

In 301, the relay performs grouping. For example, the relay may group a plurality of transmission nodes and a plurality of reception nodes that exchange data with each other in a network into the K transmit-and-receive pairs.

In 303, the relay determines transmission beamforming vectors. For example, for the K transmit-and-receive pairs that transmit signals simultaneously, the relay may determine transmission beamforming vectors for terminals included in the K transmit-and-receive pairs, in 303, so that effective channels from the K transmit-and-receive pairs to the relay may be aligned in independent dimensions, respectively. As an example, the relay may determine transmission beamforming vectors according to Equation 2 that is further described with respect to FIG. 4.

In this example, signals between terminals included in one of the K transmit-and-receive pairs may be aligned in the same dimension. For example, referring again to FIG. 1, terminal 1 101 and terminal 4 107 may form a single transmit-and-receive pair, and signals between the terminal 1 101 and the terminal 4 107 may be aligned in the same dimension, for example, an X dimension.

The relay may separate the other remaining transmit-and-receive pairs excluding one of the K transmit-and-receive pairs so that the remaining transmit-and-receive pairs are in different dimensions from the one excluded transmit-and-receive pair.

In this example, antennas of each device included in a network may be configured to perform network coding. A number of antennas (M) included in the relay may be greater than or equal to K corresponding to a number of transmit-and-receive pairs, and less than 2N corresponding to a number of antennas included in each terminal of the transmit-and-receive pairs.

In this example, a condition for a signal alignment scheme may be that M corresponding to the number of antennas included in the relay is less than 2N corresponding to the number of antennas of each terminal included in the transmit-and-receive pairs. A condition for obtaining independent dimensions for the transmit-and-receive pairs may be that M corresponding to the number of antennas included in the relay is greater than or equal to K corresponding to the number of transmit-and-receive pairs. An example of a method of the relay determining a transmission beamforming vector is described with reference to FIG. 4.

In 305, the relay detects signals transmitted by the K transmit-and-receive pairs, using the effective channels respectively aligned in independent dimensions.

In 307, the relay determines reception beamforming vectors for the terminals included in the K transmit-and-receive pairs, so that the effective channels of the terminals included in the K transmit-and-receive pairs are aligned in the same dimension.

In this example, based on an assumption that effective channels obtained by applying reception beamforming vectors to the terminals included in the K transmit-and-receive pairs are the same, the reception beamforming vectors of the terminals included in the K transmit-and-receive pairs may be determined. An example of a method of the relay determining a reception beamforming vector is described with reference to FIG. 5.

In 309, the relay simultaneously transmits network-coded signals, which are generated based on the detected signals, for the K transmit-and-receive pairs. In this example, terminals included in one of the K transmit-and-receive pairs may receive signals that are equivalently network coded. The network coding may include network coding in a physical layer, and an analog network coding.

The relay may determine the transmission beamforming vectors during a first time slot, and may determine the reception beamforming vectors during a second time slot, so as to transmit network coded signals for the K transmit-and-receive pairs, simultaneously. Accordingly, the relay may simultaneously exchange multiple two-way data transmission during using only two-time slots.

Figure 4:
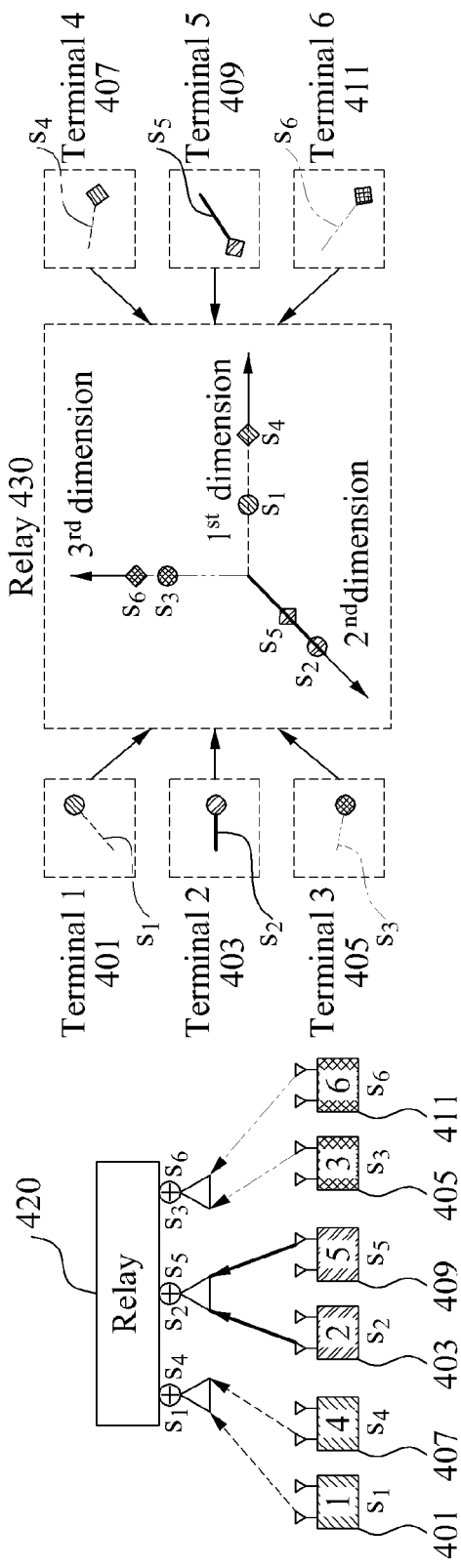
FIG. 4 is a diagram illustrating an example of a method of determining transmission beamforming vectors of terminals included in a plurality of transmit-and-receive pairs in a first phase for network coding.

FIG. 4 illustrates an example of a method of determining transmission beamforming vectors of terminals included in a plurality of transmit-and-receive pairs in a first phase for network coding.

If different nodes are to exchange signals via a two-way relay channel, a relay 420 may receive the two signals, simultaneously, at a first phase. This first phase may be referred to as a MAC phase.

For example, the relay 420 may receive a transmission signal $S_1$ of a first terminal 401 and a reception signal $S_4$ of a fourth terminal 407, may receive a transmission signal $S_2$ of a second terminal 403 and a reception signal $S_5$ of a fifth terminal 409, and may receive a transmission signal $S_3$ of a third terminal 405 and a reception signal $S_6$ of a sixth terminal 411, simultaneously.

In this example, the relay 420 may perform signal alignment when a condition satisfies Equation 1.

$$\text{span}(H_{ri}V_i) = \text{span}(H_{rk}V_k) \quad \text{[Equation 1]}$$

In Equation 1, i=1, 2, ... K, and k=i+K.

In Equation 1, $H_{ri}$ denotes a channel from an $i^{th}$ terminal included in K transmit-and-receive pairs to a relay, and $V_i$ denotes a transmission beamforming vector of the $i^{th}$ terminal.

Also, $H_{rk}$ denotes a channel from a $k^{th}$ terminal included in the K transmit-and-receive pair to the relay, and $V_k$ denotes a transmission beamforming vector of the $k^{th}$ terminal.

Span (•) denotes a space in which a column vector of a corresponding matrix is spanned.

In this example, $H_{ri}$ is a square matrix, and thus, may be spanned in any direction.

According to Equation 1, a result of spanning a channel from the first terminal 401 to the relay 420 and a transmission beamforming vector of the first terminal 401 may be equal to a result of spanning a channel from the fourth terminal 407 to the relay 420 and a beamforming vector of the fourth terminal 407. That is, in this example a signal of the first terminal 401 and a signal of the fourth terminal 407 may exist in the same dimension.

A beamforming vector satisfying Equation 1 may be calculated based on Equation 2.

$$\underbrace{\begin{bmatrix} I_M & -H_{ri} & 0 \\ I_M & 0 & -H_{ri} \end{bmatrix}}_{6\times 7} \begin{bmatrix} h_i^{align} \\ \tilde{v}_i \\ \tilde{v}_k \end{bmatrix} = M_i x_i = 0 \quad \text{[Equation 2]}$$

In Equation 2, $I_M$ denotes an identity matrix, $H_{ri}$ denotes a channel from an $i^{th}$ terminal included in the K transmit-and-receive pairs to a relay, and $v_i$ denotes a transmission beamforming vector of the $i^{th}$ terminal. Also, $h_i^{align}$ denotes a direction of alignment of each effective channel including a transmission beamforming vector.

Also, $\tilde{v}_i$ denotes an effective transmission signal of the $i^{th}$ terminal that is obtained based on a product of a transmission signal and the transmission beam forming vector of the $i^{th}$ terminal, and $\tilde{v}_k$ denotes an effective transmission signal of the $k^{th}$ terminal that is obtained based on a product of a transmission signal and the transmission beamforming vector of the $k^{th}$ terminal.

In this example, in response to a value of Equation 2 being obtained, the relay 420 may design a transmission beamforming vector that satisfies the condition. The condition may include a condition that signals between terminals included in one of transmit-and-receive pairs may be aligned in the same dimension, and effective channels from K transmit-and-receive pairs to the relay 420 are aligned in independent dimensions.

According to the linear algebra, when a number of rows is less than a number of columns in $M_i$, a null space exists, and thus, at least one $X_i$ may exist. Because $M_i$ has 6×7 dimensions in Equation 2, a null space of one dimension exists and thus, one $X_i$ satisfying Equation 2 may exist.

In this example, a condition that allows satisfying Equation 2 may be expressed by Equation 3 and Equation 4.

$$2M < M + 2N \quad \text{[Equation 3]}$$

$$M \geq K \quad \text{[Equation 4]}$$

Equation 3 is an example of a condition for signal alignment, and Equation 4 is an example of a condition for obtaining an independent dimension for each transmit-and-receive pair.

A range of M corresponding to the number of antennas included in the relay 420 may be expressed by Equation 5, based on Equation 3 and Equation 4. In response to the condition of Equation 5 being satisfied, the relay 420 may utilize a signal alignment scheme.

$$K \leq M < 2N \qquad \text{[Equation 5]}$$

If $\tilde{v}_i$ and $\tilde{v}_k$ calculated based on Equation 5 are power normalized, the relay 420 may calculate transmission beamforming vectors to be used by terminals included in the transmit-and-receive pairs, in an MAC phase. In this example, if the terminals included in the transmit-and-receive pairs simultaneously transmit signals using the transmission beamforming vectors, the relay 420 may receive a signal 430 as shown in FIG. 4.

Subsequently, the relay 420 may detect K signals included in independent dimensions using the reception beamforming vectors for the K signals, in the first phase. In this example, K is three.

For example, a reception beamforming vector $u_i$ for K signals included in independent dimensions may be calculated based on a zero-forcing beamforming scheme, as given in Equation 6.

$$u_i = \text{null}([h_1^{align} \ldots h_{i-1}^{align} h_{i+1}^{align} \ldots h_K^{align}]) \qquad \text{[Equation 6]}$$

In Equation 6, null(A) denotes a normalized vector corresponding to a null space of a matrix A.

The relay 420 may determine the reception beamforming vector $u_i$ to enable effective channels of the terminals to be null as expressed by Equation 6.

The relay 420 may separate independent dimensions so as to utilize a network coding scheme used in a two-way relay channel.

FIG. 5 illustrates an example of a method of determining reception beamforming vectors of terminals included in a plurality of transmit-and-receive pairs in a second phase for network coding. The second phase may be, for example, a broadcasting phase.

In the second phase, a reception beamforming vector of a terminal may be determined so that corresponding terminals included in transmit-and-receive pairs are able to receive K network-coded signals obtained in a first phase.

If a number of antennas of a relay 520 is greater than or equal to 2K, different signals may be transmitted to 2K terminals, respectively, using a reception beamforming vector recognized through a broadcasting channel. For example, the reception beamforming vector recognized through the broadcasting channel may be, for example, a distribution of power control (DPC) vector, a zero-forcing vector, and the like.

However, the number of antennas of the relay 520 may be in a range of K≤M<2N. That is, the number of antennas included in the relay 520 may be greater than or equal to K corresponding to a number of transmit-and-receive pairs, and less than 2N corresponding to a number of antennas of each terminal included in transmit-and-receive pairs. Accordingly, it may be difficult to transmit a desired signal to a user using the reception beamforming vector recognized through the broadcasting channel.

Therefore, an example of a channel alignment scheme is provided to overcome the drawback.

The terminals included in the transmit-and-receive pairs use a characteristic that receives signals that are equivalently network coded. The terminals that receive the equivalently network coded signals may be grouped into a single user group in the second phase. For example, a first terminal 501 and a fourth terminal 507 included in a single user group may receive the equivalently network coded signals.

In this example, although M corresponding to the number of antennas of the relay 520 is less than 2K corresponding to a number of terminals included in a network, transmission may be performed. For example, if effective channels obtained by applying corresponding reception beamforming vectors are to two terminals that exchange signals or data are the same, the relay 520 may regard channels between two terminals as the same channel. Therefore, different data may be transmitted to K users.

Based on an assumption that effective channels obtained by applying reception beamforming vectors to terminals included in the K transmit-and-receive pairs are the same, the relay 520 may determine the reception beamforming vectors of the terminals included in the K transmit-and-receive pairs, respectively.

An example of a scheme that aligns different effective channels in the same dimension may be referred to as a channel alignment scheme. The channel alignment may be expressed as given in Equation 7, similar to the signal alignment performed in the first phase.

$$\underbrace{\begin{bmatrix} I_M & -H_{ir}^H & 0 \\ I_M & 0 & -H_{ir}^H \end{bmatrix}}_{6 \times 7} \begin{bmatrix} \bar{h}_i^{align} \\ \tilde{u}_i \\ \tilde{u}_k \end{bmatrix} = \overline{M}_i \overline{x}_i = 0 \qquad \text{[Equation 7]}$$

In Equation 7, $\bar{h}_i^{align}$ denotes a direction of alignment for effective channels including the reception beamforming vectors. Also, $\tilde{u}_i$ denotes an effective reception signal of an $i^{th}$ terminal obtained by a product of a reception signal and a reception beamforming vector of the $i^{th}$ terminal, and $\tilde{u}_k$ denotes an effective reception signal of a $k^{th}$ terminal obtained by a product of a reception signal and a reception beamforming vector of the $k^{th}$ terminal.

In response to the number of antennas of the relay 520 calculated in the first phase satisfying a range of K≤M<2M, signals may be transmitted to desired terminals through the channel alignment in the second phase.

Referring to FIG. 5, the transmit-and-receive pairs such as a pair of the first terminal 501 and the fourth terminal 507, a pair of the second terminal 503 and a fifth terminal 509, and a pair of the third terminal 505 and the sixth terminal 511, may receive equivalently network coded signals through reception beamforming vectors determined by the relay 520.

For example, the first terminal 501 may receive a reception signal $S_4$, the fourth terminal 507 may receive a reception signal $S_1$, the second terminal 503 may receive a reception signal $S_5$, the fifth terminal 509 may receive a reception signal $S_2$, the third terminal 505 may receive a reception signal $S_6$, and the sixth terminal 511 may receive a reception signal $S_3$, simultaneously.

Subsequently, each terminal may receive a desired signal through self-interference.

Figure 6:
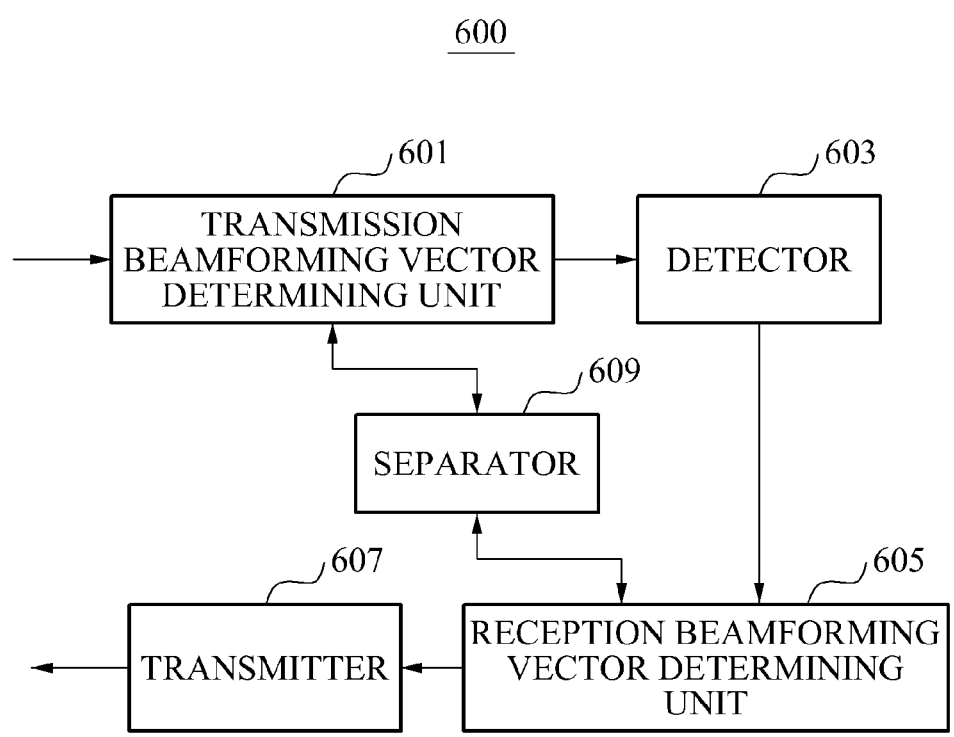
FIG. 6 is a diagram illustrating an example of a relay that performs network coding in a network including a plurality of transmit-and-receive pairs and a relay including a plurality of antennas.

FIG. 6 illustrates an example of a relay that performs network coding in a network including a plurality of transmit-and-receive pairs and a relay including a plurality of antennas Referring to FIG. 6, relay 600 that performs network coding includes a transmission beamforming vector determining unit 601, a detector 603, a reception beamforming vector determining unit 605, and a transmitter 607. Also, the relay 600 may additionally include a separator 609. The relay 600 also includes a receiver (not shown).

Here, the network may include K transmit-and-receive pairs and a relay may include M antennas, and each terminal included in the K transmit-and-receive pairs may include N antennas.

In this example, M corresponding to the number of antennas included in the relay 600 may be greater than or equal to K corresponding to the number of transmit-and-receive pairs, and less than 2N corresponding to a number of antennas of each terminal included in the transmit-and-receive pairs.

In response to the K transmit-and-receive pairs simultaneously transmitting signals, the transmission beamforming vector determining unit 601 may determine transmission beamforming vectors for the terminals included in the K transmit-and-receive pairs so as to align effective channels from the K transmit-and-receive pairs to the relay 600 in independent dimensions, respectively.

In this example, signals between terminals included in one of the K transmit-and-receive pairs may be aligned in the same dimension.

The detector 603 may detect signals transmitted from the K transmit-and-receive pairs, using effective channels aligned in the independent dimensions.

The reception beamforming vector determining unit 605 may determine reception beamforming vectors for the terminals included in the K transmit-and-receive pairs so as to align the channels of the terminals included in the K transmit-and-receive pairs in the same dimension. For example, the reception beamforming vector determining unit 605 may determine the reception beamforming vectors of the terminals included in the K transmit-and-receive pair, based on an assumption that the effective channels obtained by applying the reception beamforming vectors to the terminals included in the transmit-and-receive pairs are the same.

The transmitter 607 may simultaneously transmit network-coded signals, which are generated based on the detected signals, for the K transmit-and-receive pairs. In this example, terminals included in one of the K transmit-and-receive pairs may receive signals that are equivalently network coded.

The separator 609 may separate the remaining transmit-and-receive pairs excluding one of the K transmit-and-receive pairs to be in different dimensions from the one excluded transmit-and-receive pair.

As described herein, a relay that performs network coding may determine transmission beamforming vectors during a first time slot, and may determine reception beamforming vectors during a second time slot and thus, multiple two-way data may be exchanged during two time slots, simultaneously.

As described herein, a relay that performs network coding in a network in which signals are exchanged through the relay having a plurality of transmission and reception antennas, may determine transmission beamforming vectors of terminals so as to align effective channels of a plurality of transmit-and-receive pairs in independent dimensions. Similarly, the relay may determine reception beamforming vectors of the terminals so as to align the effective channels of the terminals included in the transmit-and-receive pairs in the same dimension, and thus, terminals may effectively exchange data.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of performing network coding in a network including K transmit-and-receive pairs and a relay including M antennas, each terminal included in the K transmit-and-receive pairs including N antennas, the method comprising:
    determining transmission beamforming vectors for the terminals included in the K transmit-and-receive pairs so that effective channels from the K transmit-and-receive pairs to the relay are aligned in independent dimensions, in response to the K transmit-and-receive pairs simultaneously transmitting signals;
    detecting the signals transmitted from the K transmit-and-receive pairs using the effective channels aligned in the independent dimensions;

determining reception beamforming vectors for the terminals included in the K transmit-and-receive pairs so that the effective channels of the terminals included in the K transmit-and-receive pairs are aligned in the same dimension; and simultaneously transmitting network-coded signals for the K transmit-and-receive pairs, the network-coded signals being generated based on the detected signals.

2. The method of claim 1, wherein M corresponding to a number of the antennas included in the relay is greater than or equal to K corresponding to a number of the transmit-and-receive pairs, and M is less than 2N corresponding to twice the number of antennas of each terminal included in the K transmit-and-receive pairs.

3. The method of claim 1, wherein the relay determines the transmission beamforming vectors in a first time slot, and performs network coding that determines the reception beamforming vectors in a second time slot.

4. The method of claim 1, wherein signals among terminals included in one of the K transmit-and-receive pairs are aligned in the same dimension.

5. The method of claim 1, further comprising:
separating remaining transmit-and-receive pairs from one of the K transmit-and-receive pairs such that the remaining transmit-and-receive pairs are in different dimensions from the one transmit-and-receive pair.

6. The method of claim 1, wherein the determining of the reception beamforming vectors of the terminals included in the K transmit-and-receive pairs is based on an assumption that the effective channels obtained by applying the reception beamforming vectors to the terminals included in the K transmit-and-receive pairs are the same.

7. The method of claim 1, wherein terminals included in one of the K transmit-and-receive pairs receive signals that are equivalently network-coded.

8. A non-transitory computer-readable storage medium having stored therein program instructions to cause a processor to execute method of performing network coding in a network including K transmit-and-receive pairs and a relay including M antennas, each terminal included in the K transmit-and-receive pairs including N antennas, the method comprising:

determining transmission beamforming vectors for the terminals included in the K transmit-and-receive pairs so that effective channels from the K transmit-and-receive pairs to the relay are aligned in independent dimensions, in response to the K transmit-and-receive pairs simultaneously transmitting signals;

detecting the signals transmitted from the K transmit-and-receive pairs using the effective channels aligned in the independent dimensions;

determining reception beamforming vectors for the terminals included in the K transmit-and-receive pairs so that the effective channels of the terminals included in the K transmit-and-receive pairs are aligned in the same dimension; and simultaneously transmitting network-coded signals for the K transmit-and-receive pairs, the network-coded signals being generated based on the detected signals.

9. A relay including M antennas that performs network coding in a network including K transmit-and-receive pairs, each terminal included in the K transmit-and-receive pairs including N antennas, the relay comprising:

a transmission beamforming vector determining unit configured to determine transmission beamforming vectors for the terminals included in the K transmit-and-receive pairs so that effective channels from the K transmit-and-receive pairs to the relay are aligned in independent dimensions, in response to the K transmit-and-receive pairs simultaneously transmitting signals;

a detector configured to detect the signals transmitted from the K transmit-and-receive pairs, using the effective channels aligned in the independent dimensions;

a reception beamforming vector determining unit configured to determine reception beamforming vectors for the terminals included in the K transmit-and-receive pairs so that the effective channels of the terminals included in the K transmit-and-receive pairs are aligned in the same dimension; and a transmitter configured to transmit network-coded signals for the K transmit-and-receive pairs simultaneously, the network-coded signals being generated based on the detected signals.

10. The relay of claim 9, wherein M corresponding to a number of the antennas included in the relay is greater than or equal to K corresponding to a number of the transmit-and-receive pairs, and M is less than 2N corresponding to twice the number of antennas of each terminal included in the K transmit-and-receive pairs.

11. The relay of claim 9, wherein the relay is configured to determine the transmission beamforming vectors in a first time slot, and perform network coding that determines the reception beamforming vectors in a second time slot.

12. The relay of claim 9, wherein signals among terminals included in one of the K transmit-and-receive pairs are aligned in the same dimension.

13. The relay of claim 9, further comprising:
a separator configured to separate remaining transmit-and-receive pairs excluding one of the K transmit-and-receive pairs from the one excluded transmit-and-receive pair so as to be in different dimensions from the one excluded transmit-and-receive pair.

14. The relay of claim 9, wherein the reception beamforming vector determining unit is configured to determine the reception beamforming vectors of the terminals included in the K transmit-and-receive pairs based on an assumption that the effective channels obtained by applying the reception beamforming vectors to the terminals included in the K transmit-and-receive pairs are the same.

15. The relay of claim 9, wherein terminals included in one of the transmit-and-receive pairs are configured to receive signals that are equivalently network-coded.

* * * * *